United States Patent
Halasipuram et al.

(10) Patent No.: US 9,367,594 B2
(45) Date of Patent: Jun. 14, 2016

(54) DETERMINING STATISTICS FOR COST-BASED OPTIMIZATION OF A WORKFLOW

(71) Applicant: International Business Machines Corporation, Armonk, NY (US)

(72) Inventors: Ramanujam S. Halasipuram, Bangalore (IN); Prasad M. Deshpande, Bangalore (IN); Sriram Padmanabhan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/853,416

(22) Filed: Mar. 29, 2013

(65) Prior Publication Data

US 2014/0297583 A1    Oct. 2, 2014

(51) Int. Cl.
*G06F 17/30* (2006.01)

(52) U.S. Cl.
CPC .... *G06F 17/30563* (2013.01); *G06F 17/30442* (2013.01); *G06F 17/30463* (2013.01)

(58) Field of Classification Search
None
See application file for complete search history.

(56) References Cited

U.S. PATENT DOCUMENTS

| | | | |
|---|---|---|---|
| 6,275,818 B1 | 8/2001 | Subramanian et al. | |
| 6,529,901 B1* | 3/2003 | Chaudhuri et al. | |
| 7,979,422 B2 | 7/2011 | Belknap et al. | |
| 2005/0187917 A1 | 8/2005 | Lawande et al. | |
| 2008/0147707 A1* | 6/2008 | Jin et al. | 707/102 |
| 2011/0314000 A1 | 12/2011 | Chaudhuri et al. | |
| 2012/0084315 A1 | 4/2012 | Schneider et al. | |

OTHER PUBLICATIONS

Stillger et al., LEO-DB2's Learning Optimizer. In Proc. of VLDB'01. Morgan Kaufmann Publishers Inc. 2001.
Chen et al., Adaptive Selectivity Estimation Using Query Feedback. In Proceedings of ACM SIGMOD 1994.
Chaudhuri et al., A Pay-as-you-go Framework for Query Execution Feedback. In Proc. of VLDB'08. VLDB Endowment, 2008.
Herodotou et al. XPLUS—A SQL Tuning-Aware Query Optimizer, in Proc. of VLDB10.
Simitsis et al., State-Space Optimization of ETL Workflows. In proceedings of IEEE Transactions on Knowledge and Data Engineering 1995.
Simitsis et al., Optimizing ETL Workflows for Fault-Tolerance. In proceedings of IEEE ICDE 2010.

(Continued)

*Primary Examiner* — Hung Q Pham
(74) *Attorney, Agent, or Firm* — Ryan, Mason & Lewis, LLP

(57) ABSTRACT

Techniques, systems, and articles of manufacture for determining statistics for cost-based optimization of a workflow. A method includes generating individual sets of statistics for each intermediate relation of a workflow, wherein said intermediate relations comprise results of stages of any plan of the workflow, and wherein each individual set of statistics computes cardinality of the corresponding intermediate relation; determining a global set of statistics for the workflow, wherein said global set of statistics comprises at least one of the individual sets of statistics for each of the intermediate relations; instrumenting a given plan of the workflow to collect the global set of statistics during execution; executing the given plan to collect the global set of statistics; and determining a plan of the workflow with the lowest cost by comparing the cost of multiple plans, wherein the cost of each plan is derived from the global set of statistics.

16 Claims, 4 Drawing Sheets

(56) References Cited

OTHER PUBLICATIONS

Sellis, ETL Workflows: From Formal Specification to Optimization, Proceedings ADBIS'07 Proceedings of the 11th East European Conference on Advances in Databases and Information Systems, pp. 1-11.

Simitsis et al., Logical Optimization of ETL Workflows, 2005.

Simitsis et al. Optimizing ETL Processes in Data Warehouses, accessed Feb. 5, 2013.

Sivaganesh et al., Optimization of ETL Work Flow in Data Warehouse, International Journal on Computer Science and Engineering (IJCSE). Sep. 9, 2012.

BOHM, Cost-Based Optimization of Integration Flows. Apr. 2011.

Aboulnaga et al., Self-Tuning Histograms: Building Histograms Without Looking at Data, In SIGMOD Conference, pp. 181-192, 1999.

Avnur et al. Eddies: Continuously Adaptive Query Processing, in SIGMOD Conference, pp. 261-272, 2000.

Chaudhuri et al., Diagnosing Estimation Errors in Page Counts Using Execution Feedback. In ICDE, pp. 1013-1022, 2008.

IBM Infosphere Datastage Balanced Optimization, Jun. 2008.

IBM InfoSphere DataStage and InfoSphere QualityStage, Version 8.5 Documentation, Dec. 2011.

Informatica, How to Achieve Flexible, Cost-effective Scalability and Performance through Pushdown Processing, Whitepaper, Nov. 2007.

Kabra et al., Efficient Mid-Query Re-Optimization of Sub-Optimal Query Execution Plans, In L. M. Haas and A. Tiwary, editors, SIGMOD 1998, Proceedings ACM Press, 1998.

R. Karp, Reducibility Among Combinatorial Problems, Complexity of Computer Computations, 1972.

Kumar et al., An Efficient Heuristic for Logical Optimization of ETL Workflows, in BIRTE, pp. 68-83, 2010.

Markl et al., Robust Query Processing through Progressive Optimization, in SIGMOD Conference, pp. 659-670, 2004.

A. Simitsis et al., Mapping Conceptual to Logical Models for ETL Processes, in DOLAP, pp. 67-76, 2005.

Simitsis et al. QoX-driven ETL design: Reducing the Cost of ETL Consulting Engagements, in SIGMOD Conference, pp. 953-960, 2009.

Transaction Processing Performance Council, Wikipedia, http://en.wikipedia.org/wiki/Transaction_Processing_Performance_Council, accessed Mar. 3, 2013.

Tziovara et al., Deciding the Physical Implementation of ETL Workflows, in DOLAP, pp. 49-56, 2007.

Urhan et al., Cost Based Query Scrambling for Initial Delays, in L.M. Haas and A. Tiwary, editors, SIGMOD 1998, Proceedings ACM SIGMOD International Conference on Management of Data, Jun. 2-4, 1998, pp. 130-141. ACM Press, 1998.

Vassiliadis et al., Conceptual Modeling for ETL Processes, in DOLAP, pp. 14-21, 2002.

Set Cover Problem, Wikipedia, http://en.wikipedia.org/wiki/Set_cover_problem#Hitting_set_formulation, accessed Mar. 28, 2013.

* cited by examiner

DETERMINING STATISTICS FOR COST-BASED OPTIMIZATION OF A WORKFLOW

FIELD OF THE INVENTION

Embodiments of the invention generally relate to information technology, and, more particularly, to workflow optimization techniques.

BACKGROUND

Extract-Transform-Load (ETL) tools are special purpose software artifacts used to populate a data warehouse with up-to-date records from one or more sources. To perform this task, a set of operations is applied on the source data. Many existing ETL tools organize such operations as a workflow.

Unlike structured query language (SQL), which is declarative in nature, ETL workflows are procedural and specify the sequence of steps to transform the source tables into the target warehouse. Many existing ETL tools provide support for the design of ETL workflows, but provide no support for optimization of such workflows. The efficiency of the ETL workflow thus depends, to a large extent, on the skill and domain knowledge of the workflow designer. Also, typically, an ETL workflow is designed once and executed periodically to load new data. Further, an ETL workflow can also degrade over time due to the changing nature of the data.

Accordingly, a need exists to optimize and re-order a workflow as needed. Further, there exists a need to develop techniques that can enable cost-based optimization of workflows when input statistics are missing.

SUMMARY

In one aspect of the present invention, techniques for determining statistics for cost-based optimization of a workflow are provided. An exemplary computer-implemented method can include steps of generating one or more individual sets of statistics for each of one or more intermediate relations of a workflow, wherein said one or more intermediate relations comprise results of one or more stages of any plan of the workflow, and wherein each individual set of statistics computes cardinality of the corresponding intermediate relation. The method also includes determining a global set of statistics for the workflow, wherein said global set of statistics comprises at least one of the one or more individual sets of statistics for each of the one or more intermediate relations, and instrumenting a given plan of the workflow to collect the global set of statistics during execution. Further, the method includes executing the given plan to collect the global set of statistics, and determining a plan of the workflow with the lowest cost by comparing the cost of multiple plans of the workflow, wherein the cost of each plan is derived from the global set of statistics.

In another aspect of the invention, an exemplary computer-implemented method can include steps of determining each of one or more intermediate relations for a given plan of a workflow, wherein said one or more intermediate relations comprise results of one or more stages of the given plan of the workflow, and generating one or more individual sets of statistics for each of the one or more intermediate relations, wherein each individual set of statistics computes cardinality of the corresponding intermediate relation. The method also includes determining a global set of statistics for the given plan of the workflow, wherein said global set of statistics comprises at least one of the one or more individual sets of statistics for each of the one or more intermediate relations, instrumenting the given plan of the workflow to collect the global set of statistics during execution, and executing the given plan to collect the global set of statistics. Further, the method includes comparing the global set of statistics collected from the given plan against one or more additional sets of the global set of statistics collected from one or more additional plans of the workflow to determine the plan with the lowest cost, wherein the cost of each plan is derived from the global set of statistics, and using the plan with the lowest cost for each of one or more subsequent runs of the workflow.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
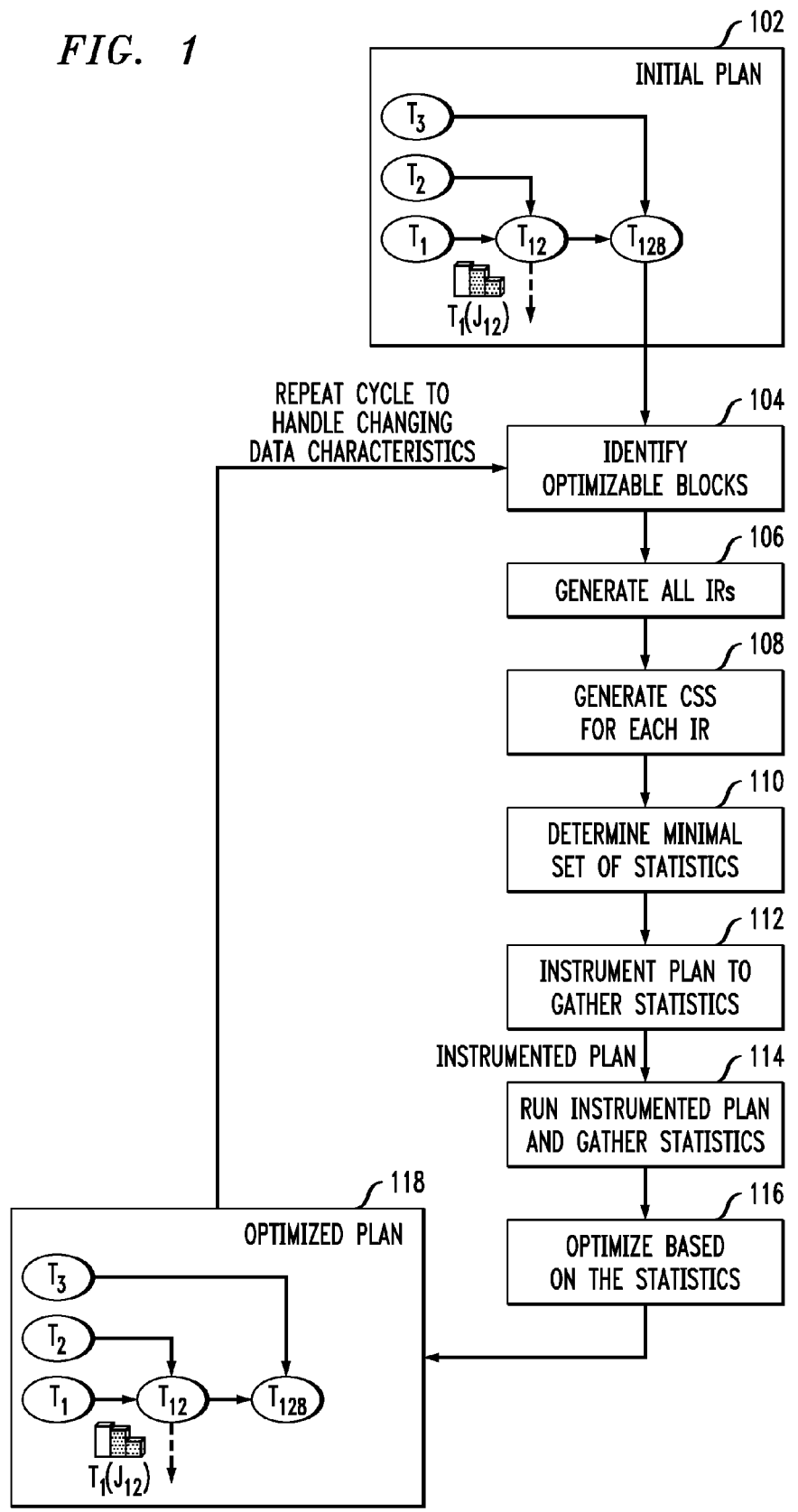
FIG. 1 is a diagram illustrating an embodiment of the invention.

As described herein, an aspect of the present invention includes determining an optimal plan for an ETL and/or SQL query when statistics on input relations are missing or unavailable. At least one embodiment of the invention includes providing a framework to determine various sets of statistics to collect for a given workflow, and using such statistics to estimate the cost of one or more alternative plans for the workflow. For example, the initial few runs of the workflow can be used to collect the statistics and subsequent runs can be optimized based on the learned statistics. Because there can be several alternative sets of statistics that are sufficient, at least one embodiment of the invention includes providing an optimization framework to select a set of statistics that can be measured with the least amount of cost and/or overhead.

As further described herein, the cost of an operator is dependent on the cardinalities of the inputs. As used herein, an operator performs an operation defined in an ETL plan (such as, for example, join, filter, etc.). Additionally, as used herein, cardinality refers to the count of the number of rows of a relation. Accordingly, if the cardinalities of all possible intermediate results (intermediate relations (IRs), as referred to herein) are computed, the cost of any operator in any re-ordering of the workflow can also be computed.

For example, the cost functions of different relational/ETL operators can take the cardinality of the inputs to determine the cost of the operator. If the cardinalities of the inputs are known, the cost of the operator can be determined. As such, if the cardinalities of all possible IRs are computed, the cost of any operator, the complete plan and all alternative plans of the workflow can be computed.

As used herein, several notations utilized in the description herein of one or more embodiments of the invention are explained as follows:

IR refers to the set of all possible intermediate relations (IRs) over all of the plans for an ETL/query.

$T_i$ refers to the relation $T_i$.

$T_{ij}$ refers to the result of a join between $T_i$ and $T_j$.

$H_T^a$ refers to a histogram on attribute a of relation T.

$|H_T^a|$ refers to the sum of the values in the histogram, which will be the total cardinality of T(|T|).

|a| refers to the number of distinct values of attribute a in the input relations.

$J_{ij}$ refers to a join key between $T_i$ and $T_j$.

$\bowtie_{J_{ij}}$ refers to a join of relations $T_i$ and $T_j$ using $J_{ij}$.

$T_i^{J_{ij}}$ refers to the rows from $T_i$ that were satisfied the join predicate $J_{ij}$.

$\overline{T_i^{J_{ij}}}$ refers to the rows from $T_i$ that were rejected by join predicate $J_{ij}$.

$\langle H_{T_1}^a | H_{T_2}^a \rangle$ indicates that for each bucket of the histogram $H_{T_1}^a$, the frequency value is to be multiplied by its corresponding frequency value in $H_{T_2}^a$.

$$\frac{H_{T_1}^a}{H_{T_2}^a}$$

to indicates that for each bucket of the histogram $H_{T_1}^a$, the frequency value is to be divided by its corresponding frequency value in $H_{T_2}^a$.

DV(T,a) refers to the number of distinct values of attribute a in T.

TR(T,a) refers to some ETL transform operator applied to attribute a of T.

Given a SQL query and/or ETL workflow, determining an optimal plan based on a cost metric involves identifying different possible re-orderings of the given query and their associated costs. Cost-based optimizers use different transformation rules defined by the semantics of the operator to determine alternative orderings of the given query. These transformation rules define all valid re-orderings of the operators and thus enable the optimizer in generating a search space of candidate plans. Once the candidate plans are identified, operator cost models help the optimizer in determining the cost of the plan. The cost model estimates the cost of each operator based on inputs such as the cardinalities of the input relations, central processing unit (CPU) and disk-access speeds, memory availability, etc. Particularly noteworthy factors in determining the cost of any operator (including the standard select, project, join and group-by operators) are the cardinalities of the inputs. Thus, for a given plan, if the cardinalities of all the intermediate relations of the plan are determined, the cost of any operator in the plan and therefore the total cost of the plan can be computed.

As detailed herein, to determine the output-cardinality of an IR, cost models use statistics on the input relations such as histograms, etc. A set of statistics that is sufficient for computing the cardinality of an IR is defined as a sufficient statistics set for that IR. Further, such a set is minimal if any subset thereof is not sufficient. Such a minimally sufficient set of statistics is denoted as a candidate statistics set (CSS) for that IR. There can be multiple CSSs for an IR. The trivial CSS for any IR is the output cardinality of the IR itself, because IR may actually be observable in the plan.

As noted, if at least one CSS for all IRs in the set IR is available, the cost of any plan for the given query can be computed, thus enabling the cost-based optimizer to select the best plan. Therefore, any framework that identifies sufficient statistics to enable cost-based optimization should guarantee that the statistics identified are enough to compute the cost of any IR in the set IR for the given query.

FIG. 1 is a diagram illustrating an embodiment of the invention. Specifically, a flow of the ETL optimization process is shown in FIG. 1. The process starts with the initial plan 102, that is, the workflow defined by the user. The system analyzes the workflow to determine optimizable blocks in step 104. For each optimizable block, the set of all possible IRs is determined and generated in step 106. Step 108 includes determining the possible CSS for each IR. From this, a global set of statistics is determined in step 110 such that the set contains at least one CSS for each IR. The plan is then instrumented in step 112 with code to collect these statistics and run in step 114 to actually gather the statistics. Based on the collected statistics, the optimizer can assess the costs of alternative plans, and the best (for example, most cost-efficient) plan 118 is chosen for future runs of the flow in step 116. The entire cycle can be repeated periodically, as the underlying data characteristics may change. If the data change sufficiently, a plan that was optimal at one time may no longer be optimal after the noted changes. Accordingly, it becomes advantageous to periodically collect the statistics and re-optimize. The process can either repeat at each run of the workflow or at some other user-defined interval.

As noted herein, ETL workflows present several challenges that are unique as compared to traditional SQL query optimization. Some of these challenges preclude the optimization of the entire workflow as one unit, and the workflow is to be broken up into smaller units, each of which can be independently optimized. Accordingly, in at least one embodiment of the invention, the system analyzes the workflow to identify the points in the flow such that the operators cannot be moved across these boundaries for optimization. Specifically, one or more conditions, including materialized intermediate results, transformation operators, and aggregate user-defined function (UDF) operators, can be checked Often in ETL flows, some intermediate results are specifically materialized by the flow designer, typically to aid diagnostics or to be used in some other flow. A common example is a reject link that collects the tuples in a relation that do not join with the other relation. Some blocking operators such as sort may also need the preceding results to be explicitly materialized. Further, any point at which an intermediate result is explicitly materialized identifies a block boundary.

Another common pattern for ETL flows is the use of transformation operators that transform attribute values from one form to another. Often, the transformation operators do not affect the join re-orderings. However, in some cases, when the operator is applied on an attribute derived from the join of multiple relations $T_1, T_2, \ldots T_n$, and when its result is used in a further join, the operator forces the relations $T_1, T_2, \ldots T_n$ to be always joined before they join with the rest of the relations. This, in effect, creates a block boundary.

Additionally, UDFs and custom operators are also frequently used in ETL workflows. A custom operator that aggregates its input tuples to produce a smaller number of output tuples is blocking in nature. Because the semantics of the operators is a black box to the optimizer, the safest strategy is to consider it as a block boundary.

As additionally depicted in FIG. 1, at least one embodiment of the invention includes identifying all possible IRs for each optimizable block. The set of possible IRs depends on the semantics of the operators, which determines where the operator can be placed in the flow. For a join on multiple relations, there are many different join orders that are possible, and each join order would generate a set of IRs. If there are n relations, $T_1, T_2, \ldots T_n$ being joined, the set of IRs includes joins corresponding to all possible subsets ($2^n$) of $\{T_1, T_2, \ldots T_n\}$, because each such join can occur as an IR in some join order. For example, for a join on three relations, the set IR includes $\{T_1, T_2, T_2, T_{12}, T_{13}, T_{23}, T_{123}\}$.

Once the IRs are determined, at least one embodiment of the invention includes computing possible CSS for each of the IR. Each CSS for an IR provides an alternative for estimating the cardinalities of that IR.

Also, there is a cost associated with observing a CSS in a given flow, which could include the CPU cost and the memory cost for observing the distributions. Accordingly, as noted in FIG. 1, at least one embodiment of the invention includes selecting a set of statistics such that at least one CSS for each IR is covered, and, at the same time, the cost of observing the statistics is minimal.

The plan has to be instrumented to observe the set of statistics that is chosen by the previous step. Many commercial ETL engines provide a mechanism to plug-in user-defined handlers at any point in the flow. These handlers, for example, are invoked for every tuple that passes through that point. This makes it easy to plug-in code that can observe the required statistics. In at least one embodiment of the invention, the types of statistics to be considered include cardinality and distributions.

The cardinality of any observable IR can be observed by maintaining a counter at the corresponding point in the flow. The counter is incremented for each tuple passing through that point. The memory cost of this is the cost of maintaining one integer (for example, four bytes) in memory.

The distribution (histograms) of any observable IR can be observed by maintaining a histogram at the corresponding point. For each tuple passing through the point, the attribute corresponding to the histogram is observed and the corresponding histogram bucket is incremented. The memory cost of this is equal to the domain size of the attribute on which the histogram is being built.

In the case of optimizing SQL queries, the statistics framework can be closely integrated with the optimization and query execution engine to be able to observe the required statistics.

In the step of running the instrumented plan and observing statistics, the instrumented plan is executed and the required statistics are gathered. The previous steps ensure that sufficient statistics are now available for the optimizer to cost any possible plan for the given ETL/query.

Optimizing the ETL/query step uses traditional cost based optimization techniques to determine the plan with the least cost. Because all of the required statistics are already computed, the cost of each alternative plan can be accurately determined.

The cardinality of IRs can be observed directly when the workflow is being executed. However, with simply observing the cardinality, only a limited number of the IRs can be observed. If an IR is not formed in the given plan, it may not be possible to observe the cardinality of that IR, and thus, a challenge exists in determining the optimal solution. If the workflow is allowed to be executed repeatedly with varying plans, the cardinality of all intermediate relations can be observed by varying the plans.

Additionally, at least one embodiment of the invention includes computing the cardinalities of one or more IRs in conjunction with observing some statistics on the inputs of the IRs. For example, the cardinality of an IR which is a join of two input relations can be computed by observing the distributions of the join keys on each of the inputs. In a first example, let $J_{13}$ denote the join key for relations $T_1$ and $T_3$. The cardinality of $T_{13}$ can be computed by observing the distribution of $J_{13}$ on $T_1$ and $T_3$.

Also, at least one embodiment of the invention includes implementing a division-union method. For example, when relations A, B and C are joining in that order (that is, A, AB, ABC), the cardinality of AC is not directly observable. An example embodiment of the invention, however, can compute the cardinality by carrying out the following two-step calculation.

The first step includes computing the rows in AC that are also part of ABC. This can be computed by observing the distribution of the join key of ABC and B, and dividing the distributions. The second step includes computing the rows in A that were rejected at AB, and which can potentially join with C. This can be carried out, for instance, by observing the distribution of the join key of (A join C) on the rows of A that were rejected at AB and the input relation C.

In the case of the first example noted above, the cardinality of $T_{13}$ can be determined by computing the rows in $T_{13}$ that were part of $T_{123}$. This can be carried out by observing the distribution of join key of (13, 2) on $T_{123}$ and $T_2$. Additionally, this cardinality determination includes computing the rows in $T_1$ (that were rejected at $T_{12}$) which could potentially join with $T_3$. This can be carried out by observing the distribution of join key of (1, 3) on $T_1'$ and $T_3$. As noted above (and additionally herein), variable T refers to a relation (either a source or an intermediate relation), and variable J refers to a set of attributes used by the 'join' operator to join input relations.

In light of the above, the below table denotes multiple options for determining cardinality in the first example.

| Relations | Options |
|---|---|
| $|T_{12}|$ | Observed directly $|T_{12}|$ <br> $<H_{T_1}^{J_{12}}|H_{T_2}^{J_{12}}>$ |
| $|T_{13}|$ | $<H_{T_1}^{J_{13}}|H_{T_3}^{J_{13}}>$ |
| | $\dfrac{H_{T_{123}}^{J_{2(13)}}}{H_{T_2}^{J_{2(13)}}} \cup \left(H_{T_1'}^{J_{13}} \mid H_{T_3}^{J_{13}}\right)$ |

As noted, at least one embodiment includes generating a candidate statistic set (CSS). Generating a CSS includes two steps. In the first step, all possible CSSs are generated. In the second step, CSS which are not observable are discarded.

By way of illustration, observing a trivial CSS corresponds to observing only the cardinalities (no distributions) at various points in the plan. This is a quick, easy-to-implement and low-overhead method of passive monitoring that can be used to obtain the actual cardinalities of IRs which are part of the plan being executed. However, the trivial CSS of all of the IRs may not be observable in a single plan. This can be addressed by repeating the query execution with different plans such that each IR is covered in some plan.

At least one embodiment of the invention, rather than restricting to measuring only cardinalities, includes observing distributions, which enables obtaining all of the required statistics in a single plan execution.

If the technique is not restricted to using trivial CSS, at least one embodiment of the invention can include using histograms (single and multi-attribute distributions) as candidate statistics. Each workflow is comprised of a sequence of operators. The semantics of each operator determines the statistics that can be used to estimate the size of the output. In general, enabling estimation over a composition of operators requires defining rules for each type of operator. In connection with at least one embodiment of the invention, there are two types of rules: cardinality rules and distribution rules. A cardinality rule determines the input cardinalities or distributions needed to estimate the cardinality of the output. A distribution rule determines the input cardinalities and distributions needed to estimate the distribution of an attribute on the output of an operator. Additionally, these rules can be applied recursively to generate different CSS for a given IR.

Rules for select and project operators can include the following. One rule can indicate that the cardinality of a selection can be estimated if the distribution on the selection attribute is known. Another rule can specify that the distribution of an attribute b on the output of a selection on attribute a can be estimated if a joint distribution on (a, b) is known on the input relation. The project operator only selects certain columns, so the output cardinalities and distributions are identical to the input cardinalities and distributions. The rules for select and project operators can be found in the following table:

| Id | Operator | Rule Type | Output | Input |
| --- | --- | --- | --- | --- |
| SC1 | Select | Cardinality | $|\sigma_a(T)|$ | $H_T^a$ |
| SD1 | Select | Distribution | $H_{\sigma_a(T)}^b$ | $H_T^{(a,b)}$ if $b \neq a$ |
| PC1 | Project | Cardinality | $|\pi_a(T)|$ | $|T|$ |
| PD1 | Project | Distribution | $H_{\pi_a(T)}^b$ | $H_T^b$ |

As described herein, there are multiple ways to estimate the cardinality of a join operator. Such ways are listed below in the following table:

| Id | Rule Type | Output | Input |
| --- | --- | --- | --- |
| JC1 | Cardinality | $|T_1 \bowtie T_2|$ | $H_{T_1}^{J_{12}}, H_{T_2}^{J_{12}}$ |
| JD1.1 | Distribution | $H_{T_1 \bowtie T_2}^b$, where $b \neq J_{12}$ | $H_{T_1}^{J_{12},b}, H_{T_2}^{J_{12}}$ if $b \in T_1$<br>$H_{T_1}^{J_{12}}, H_{T_2}^{J_{12},b}$ otherwise |
| JD1.2 | Distribution | $H_{T_1 \bowtie T_2}^b$, where $b \equiv J_{12}$ | $H_{T_1}^b, H_{T_2}^b$ |
| JC2 | Cardinality | $|T_1 \bowtie T_3|$ | $H_{T_{123}}^J, H_{T_2}^J,$<br>$|\overline{T}_1^{J_{12}} \bowtie T_3|$ |
| JD2 | Distribution | $H_{T_1 \bowtie T_3}^a$ | $H_{T_{123}}^{J,a}, H_{T_2}^J,$<br>$H_{\overline{T}_1^{J_{12}} \bowtie T}^a$ |

One set of rules (referred to, for example, as JC1 and JD1) can be derived from the standard technique used by optimizers to estimate join cardinalities. The cardinality of a join can be determined from the distributions on the input tables on the join attribute by taking a dot product (that is, $|T_1 \bowtie T_2| = H_{T_1}^{J_{12}}, H_{T_2}^{J_{12}}$. Similarly, estimating the distribution on the output of the join includes implementing a joint distribution on attributes (for example, $J_{12}$, b on the table to which b belongs). A matrix multiplication between the two distributions $H_{T_1}^{J_{12},b}$ and $H_{T_2}^{J_{12}}$ will produce the required distribution on the join results $H_{T_1 \bowtie T_2}^b$, in the case where $b \in T_1$.

Another set of rules (referred to herein, for example, as rules JC2 and JD2) are derived from the union-division method, which is a new method proposed by us in order to exploit the observable statistics from the plan to the maximum. For example, consider an initial plan wherein IR $T_{13}$ is not directly observable, but $T_{123}$ is observable. Accordingly an example embodiment of the invention could include exploiting the distributions on $T_{123}$. As such, all of the rows that form part of IR $T_{123}$ would be part of $T_{13}$, and rows from $T_1$ that do not join with $T_2$ get filtered from $T_{123}$, whereas they are included in $T_{13}$.

To compute the cardinality of $T_{13}$, the cardinalities of $$\left(T_1^{J_{12}} \bowtie^{J_{13}} T_3\right) \text{ and } \left(\overline{T}_1^{J_{12}} \bowtie^{J_{13}} T_3\right)$$

need to be computed. Accordingly, to compute the cardinality of $T_{13}$, it must be observed, in this example, that $H_{T_{123}}^{J_{12}}, H_{T_2}^{J_{12}}$ and $$\left|\left(\overline{T}_1^{J_{12}} \bowtie^{J_{13}} T_3\right)\right|,$$

as mentioned in the rule JC2 (detailed above). The rule JD2 can be similarly derived. Note also that to observe $$\overline{T}_1^{J_{12}} \bowtie^{J_{13}} T_3,$$

adding an explicit reject link for $T_1$ after its join with $T_2$ may be required, if one does not already exist.

Additionally, at least one embodiment of the invention also includes rules for group-by operators. One rule indicates that the cardinality of the group-by is the same as the number of distinct values of the group-by attributes in an input table. The distribution of attributes b on the group-by result can be computed from the histogram on T for attributes a, when $b \subseteq a$. If b is not a subset of a, the distribution does not exist because b will not be present in the output tuples.

Further, at least one embodiment of the invention, as detailed herein, includes rules for transformation operators. These operators can, for example, be custom user-defined functions. Because transformation operators only transform attributes, they do not affect the cardinality. Thus, the cardinality of the output is the same as that of the input. The distribution of attributes b on the transformation result is the same as the distribution of b on the input, if $b \neq a$. This is because the transformation leaves b unchanged. If $b = a$, the distribution of output cannot be computed from the input distributions in a general sense, because it depends on the actual transformation function.

As detailed above, to determine the cardinality of an IR, different statistics (that is statistic-sets) might be necessary. The cost of determining each of these statistics can likewise be different. Such costs can include a model of the memory cost of holding these statistics and/or the computational overhead of actually measuring the statistics. Also, as noted, there can be multiple ways in which the cardinality of an IR can be computed, and thus, there can be multiple such statistic-sets, each with its own cost (referred to herein as candidate-statistic-sets). In at least one embodiment of the invention, among candidate-statistic-sets, the set with the lowest (minimal) cost forms the minimal-statistic-set for that IR.

It can be possible that the minimal-statistic-set for two IRs is not composed of the minimal-statistic-sets of the individual IR, but that the minimal-statistic-set can come from their respective candidate-statistic-sets because the IRs can share a common statistic, and thus, its cost as well. If both $T_{12}$ and $T_{13}$ are being joined on the same key (that is, $J_{12}=J_{13}$), the candidate-statistic-sets for $T_{12}$ and $T_{13}$ are as follows:

| S No | Relations | Candidate-statistic sets | Cost | Optimal |
|---|---|---|---|---|
| 1 | $|T_{12}|$ | $|T_{12}|$ | 9.0 | |
| 2 | | $H_{T_1}^{J_{12}}, H_{T_2}^{J_{12}}$ | 10.0 (9, 1) | (22) 13.0 |
| 3 | $|T_{13}|$ | $H_{T_1}^{J_{13}}, H_{T_3}^{J_{13}}$ | 12.0 (9, 3) | (9, 9, 1, 3) |
| 4 | | $H_{T_{123}}^{J_{2(13)}}, H_{T_2}^{J_{2(13)}}, H_{T_1}^{J_{13}}, H_{T_3}^{J_{13}}$ | 11.0 | |

Accordingly, the minimal-statistic-set for $T_{12}$ is (1) and the minimal-statistic-set for $T_{13}$ is (4). However, considering the minimal-statistic-set for both of these IRs, the cost of observing the distribution of the join key of $T_{12}$ on $T_1$ (Dist($T_1$, $J_{12}$)) can be shared with $T_{13}$ as well, because the join key of both $T_{12}$ and $T_{13}$ are same. Therefore, the minimal-statistic-set for both $T_{12}$ and $T_{13}$ is (2) and (3).

In at least one embodiment of the invention, the minimal-statistic-set for all of the IRs of the given workflow forms the optimal solution. As detailed herein, if the cardinalities of all of the IRs can be computed, the cost of any operator can be determined, and thus the cost of a plan can be computed as well. Once the cost of a plan is computable, at least one embodiment of the invention includes determining the optimal (best) plan among the relevant group of plans.

As described herein, there can be multiple possible CSS for each IR. The cost of observing the statistics in a CSS can vary widely. There can also be multiple cost metrics used to measure the cost of a CSS, such as the CPU-cost of observing the statistics, the memory overhead for maintaining the statistics, etc. A goal of optimizing is to select an optimal set of statistics with respect to the cost metric such that at least one CSS for each IR is covered.

One approach of choosing the least costly CSS for each IR includes considerations that are not globally optimal. The reason is the amortization of cost of the statistics that are common across the CSS. Accordingly, in formulating the problem, let IR=$\{IR_1, IR_2, \ldots, IR_m\}$ be the set of all possible IRs. Each $IR_k$ has a set of CSSs. Let $CSS_{kl}$ denote the lth CSS for $IR_k$. Let S=$\{s_1, s_2, \ldots, s_n\}$, the set of all possible statistics that can be observed.

The problem can be defined, for example, as finding a set of statistics to observe $S_0 \subseteq S$ such that it satisfies two properties:

At least one CSS for each IR is covered; that is, $\forall_k \forall_l CSS_{kl} \subseteq S_o$; and $S_o$ is optimal in terms of the cost of observation.

Therefore, in principle, the problem is to find a subset of S under some constraints. This can be modeled as an extended version of the classical Hitting-Set Problem, and can be solved, for example, using a linear programming formulation.

In a linear programming (LP) formulation of the problem, a variable x is associated with S, and the value of variable x, is one if the corresponding statistic $s_i$ is being observed. A variable y is associated with the set of CSSs such that, $y_{kl}$ is one if the corresponding $CSS_{kl}$ is covered.

To ensure that a CSS is declared covered only if all of the constituent statistics are observed, the following set of constraints is introduced, one for each $CSS_{kl}$ (that is, $\forall_k \forall_l$):

$$\sum_{i:s_i \in CSS_{kl}} x_i \geq y_{kl} \cdot |CSS_{kl}|$$

Similarly, to ensure that an IR is deemed covered if any of its CSSs are covered, the following set of constraints is introduced, one for each IR (that is, $\forall_k$):

$$\sum_l y_{kl} \geq 1$$

With this formulation, the objective of the LP is to optimize the following function:

$$\min \Sigma c_i x_i$$

The LP formulation can potentially take a long time to solve because there may be a large number of IRs and CSSs. In such a case, greedy heuristics can be used to arrive at a solution. One example heuristic includes, in each round, to select the CSS with the lowest cost from the set of CSSs that cover at least one of the uncovered IRs. After each step, the newly-covered IRs are removed from the set of uncovered IRs. Also, the costs of the remaining CSSs are reduced based on the statistics selected in this step because these statistics would be available.

The cost of a CSS can be measured in terms of various metrics. By way of example, consider two metrics: the memory overhead and the CPU cost. The memory overhead of measuring a histogram on a set of attributes is equal to the number of distinct values of that set of attributes. However, because the exact number of distinct values of a set of attributes may not be known, at least one embodiment of the invention includes using the number of all possible values. Thus, the memory requirement for a single attribute histogram is proportional to the cardinality of the attribute. For histograms on multiple attributes, the memory required is the product of the cardinalities of the constituent attributes. The CPU cost of measuring a statistic is proportional to the number of tuples in the IR on which the statistic is measured, because for each tuple, the statistic needs to be updated. Thus, to compute the actual CPU cost, one or more embodiments of the invention include utilizing the sizes of the IRs, which is what is being estimated using the statistic. This circular dependency can be broken, for example, by using the IR sizes computed from previous runs. In a first run, a coarse approximation based on independence assumptions can be used because no previous data are available.

Additionally, in at least one embodiment of the invention, the metadata of an underlying data model can be exploited to introduce new or additional alternatives for computing the cardinalities, and/or to reduce the number of IRs for which a cardinality needs to be computed. In the noted first example above, if $T_2$ has a foreign key on $T_1$, $T_{12}$ is being joined on the key, and $T_1$ does not have any filter predicates, the cardinality of $T_2$ is same as the cardinality of $T_{12}$. Therefore, it may be sufficient to determine only one of those two cardinalities.

By way of illustration, consider a second example wherein there includes a collection of different statistics that can be observed in a plan during the plan's current execution. If any of these statistics are being observed, then that statistic is referred to herein as being "hit." In this second example, there is a set of choices $C=\{c_1, c_2, \ldots, c_n\}$. Such choices can include, for example, observing $dist(T_1, a)$, $card(T_1)$, card $(T_{12})$, etc. For this second example, assume that $c_1=card(T_{12})$, $c_2=dist(T_1, a)$, $c_3=dist(T_2, a)$, $c_4=dist(T_3, a)$. As used here, 'a' refers to an attribute of the relation. For example, $dist(T_1, a)$ indicates distribution of attribute a on relation $T_1$.

Candidate-statistic-sets are formed by determining the sub-sets of these choices, which can determine the cardinality of an IR. If all of the elements of any of the candidate-statistic-sets are available, the IR is said to be solved or covered. The sub-sets of these choices provide a covering for an IR. By way of example, $Q_k=T_{12}=\{\{c_1\}, \{c_2, c_3\}, \ldots\}$. As used here, $Q_k$ represents the collection of choices present for solving a particular IR. For example, $Q_k=T_{12}=\{\{c_1\}, \{c_2, c_3\}\}$ indicates that the collection of choices present to solve/cover IR $T_{12}$ is $Q_k$, and to cover $T_{12}$, either $\{c_1\}$ or $\{c_2, c_3\}$ is needed.

Additionally, as referred to herein, a subset is identified as being hit if all of the elements of the sub-set are hit. For example, $\{c_2, c_3\}$ is assumed to be hit if both $c_2$ and $c_3$ are hit, individually. Additionally, an IR is considered solved if any of the candidate-statistic-sets (sub-sets) of that IR are hit. Further, in this second example, $T_{12}$ is solved if any of its sub-sets, $s_1=\{c_1\}$ or $s_2=\{c_2, c_3\}$, are hit.

Accordingly, at least one embodiment of the invention includes determining a sub-set of C with minimal cost such that all intermediate relations are solved. By way of example, this can be modeled as a modified Hitting-set problem. In illustrating a Hitting Set Problem, consider the following: Given m subsets of a finite set N, the problem is to find an $X \subset N$ of minimum cardinality that "hits" (intersects) all of the given m subsets.

Generally, the number of tables involved in an ETL workflow (or an SQL query) is limited, and therefore a linear programming formulation of the problem can be employed to solve the problem. Otherwise, at least one embodiment of the invention includes implementing greedy heuristics to approximate a solution. For example, a greedy heuristic can include the following:

Step 1: Compute the costs of all candidate-statistic-sets (and sub-sets).

Step 2: Select (hit) the sub-set that has the lowest (minimum) cost.

Step 3: Solve possible IRs.

Step 4: Repeat Steps 1-3 until all IRs are solved.

Additionally, the techniques detailed herein can be implemented within a system that is running under various constrained environments. Accordingly, such an embodiment of the invention includes adhering to the constrained resources and producing plans under these conditions. For example, such constraints can include memory constraints, wherein the total memory available for observing statistics may be bounded. In such an instance, the optimal solution will minimize the error in estimation under the memory constraints. Also, an example constraint can include error constraints, wherein the maximum error in an estimation is bounded. In such an instance, the optimal solution will minimize the costs while keeping the error within the noted bounds.

Also, in many instances, there exists a limited amount of statistics already available, especially, for example, when the source systems are relational database (DB) systems. In such a scenario, at least one embodiment of the invention includes implementing semantics to ensure that relevant existing statistics are utilized. By way of example, all IRs whose cardinalities are available can be marked or identified as covered, and other statistics that are available can be marked or identified as "to be observed," with the associated cost being 0. Accordingly, such embodiments of the invention do not generate statistics for already covered IRs, and moreover, such embodiments of the invention take advantage of statistics that are already available.

Figure 2:
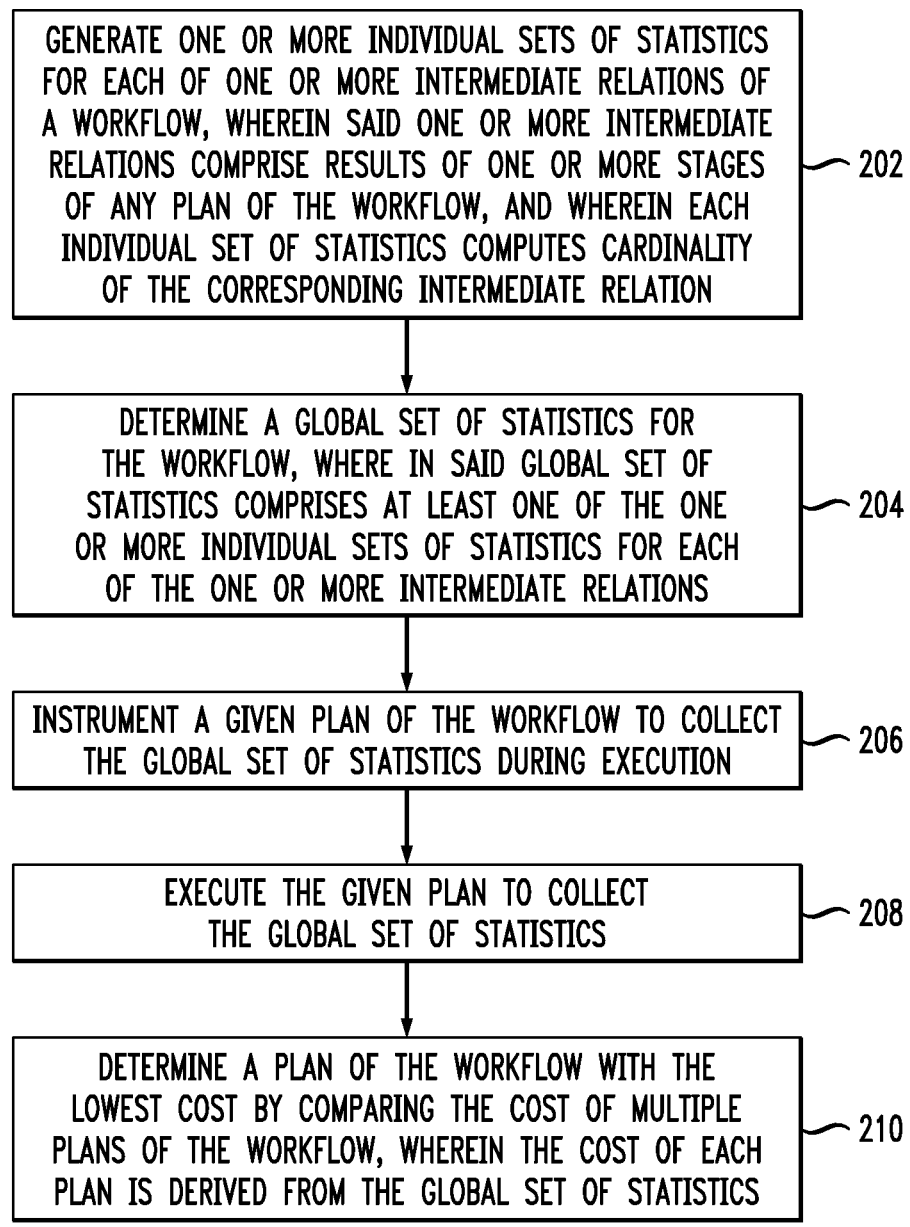
FIG. 2 is a flow diagram illustrating techniques according to an embodiment of the invention.

FIG. 2 is a flow diagram illustrating techniques according to an embodiment of the present invention. Step 202 includes generating one or more individual sets of statistics for each of one or more intermediate relations of a workflow, wherein said one or more intermediate relations comprise results of one or more stages of any plan of the workflow, and wherein each individual set of statistics computes cardinality of the corresponding intermediate relation. The workflow can include, for example, an Extract-Transform-Load (ETL) workflow or a structured query language (SQL) statement.

Step 204 includes determining a global set of statistics for the workflow, wherein said global set of statistics comprises at least one of the one or more individual sets of statistics for each of the one or more intermediate relations. Additionally, at least one embodiment of the invention includes implementing semantics to leverage existing statistics.

Determining a global set of statistics can include computing a cost for collecting the one or more individual sets of statistics. Costs for collecting the individual sets of statistics can include a memory cost of holding the individual sets of statistics and/or computational overhead for measuring the one or more individual sets of statistics.

Step 206 includes instrumenting a given plan of the workflow to collect the global set of statistics during execution. Step 208 includes executing the given plan to collect the global set of statistics.

Step 210 includes determining a plan of the workflow with the lowest cost by comparing the cost of multiple plans of the workflow, wherein the cost of each plan is derived from the global set of statistics.

The techniques depicted in FIG. 2 can also include adhering to one or more constrained resources associated with the workflow. As detailed herein, constrained resources can include memory constraints (for example, a limit on total memory available for computing statistics) and/or error constraints. Further, at least one embodiment of the invention includes adhering to one or more requirements imposed due to materialized intermediate relations during reordering of the workflow.

Figure 3:
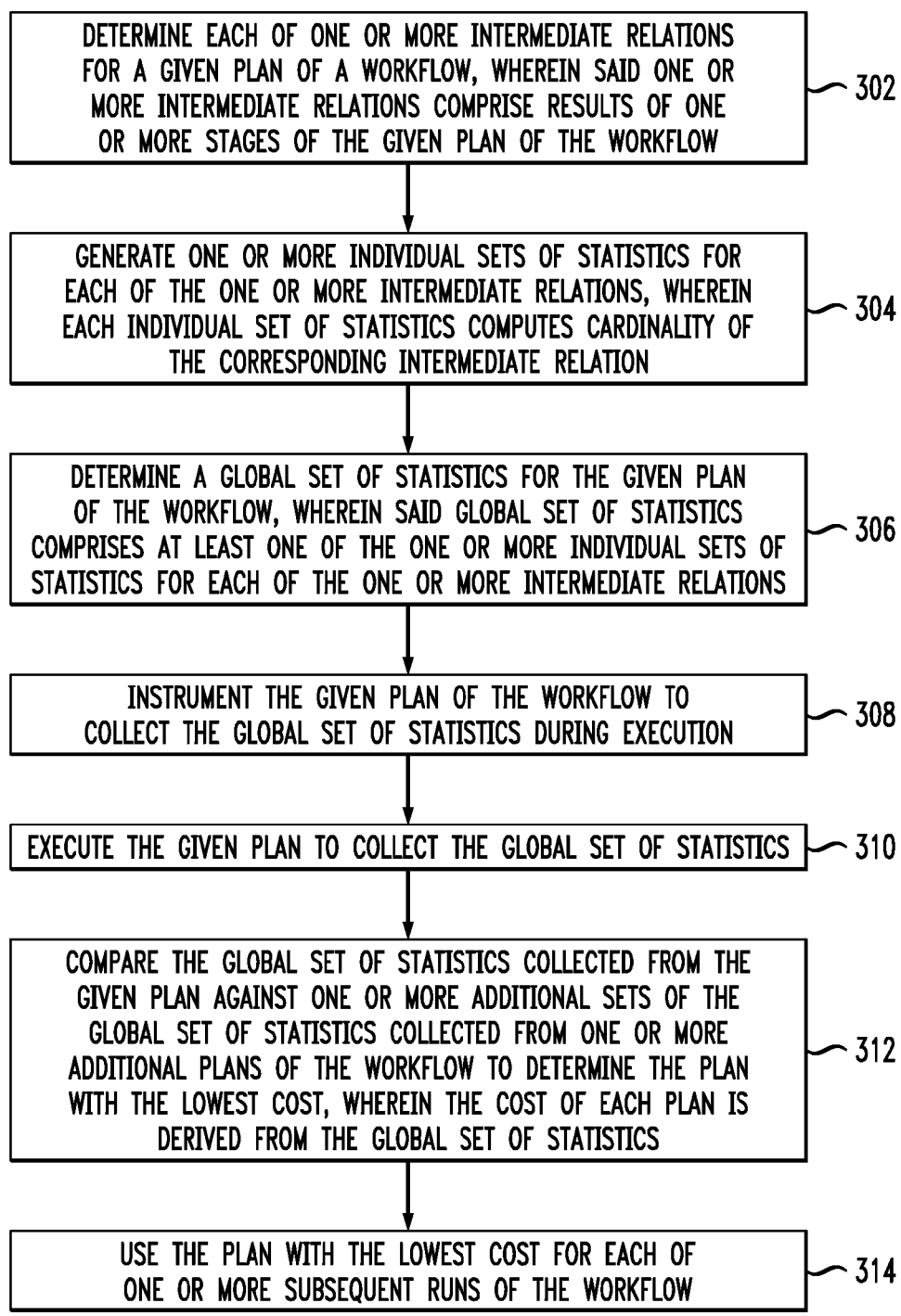
FIG. 3 is a flow diagram illustrating techniques according to an embodiment of the invention.

FIG. 3 is a flow diagram illustrating techniques according to an embodiment of the invention. Step 302 includes determining each of one or more intermediate relations for a given plan of a workflow, wherein said one or more intermediate relations comprise results of one or more stages of the given plan of the workflow. Step 304 includes generating one or more individual sets of statistics for each of the one or more intermediate relations, wherein each individual set of statistics computes cardinality of the corresponding intermediate relation. Step 306 includes determining a global set of statistics for the given plan of the workflow, wherein said global set of statistics comprises at least one of the one or more individual sets of statistics for each of the one or more intermediate relations.

Step 308 includes instrumenting the given plan of the workflow to collect the global set of statistics during execution. Step 310 includes executing the given plan to collect the global set of statistics. Step 312 includes comparing the global set of statistics collected from the given plan against one or more additional sets of the global set of statistics collected from one or more additional plans of the workflow to determine the plan with the lowest cost, wherein the cost of each plan is derived from the global set of statistics. Step 314 includes using the plan with the lowest cost for each of one or more subsequent runs of the workflow.

The techniques depicted in FIG. 2 and FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
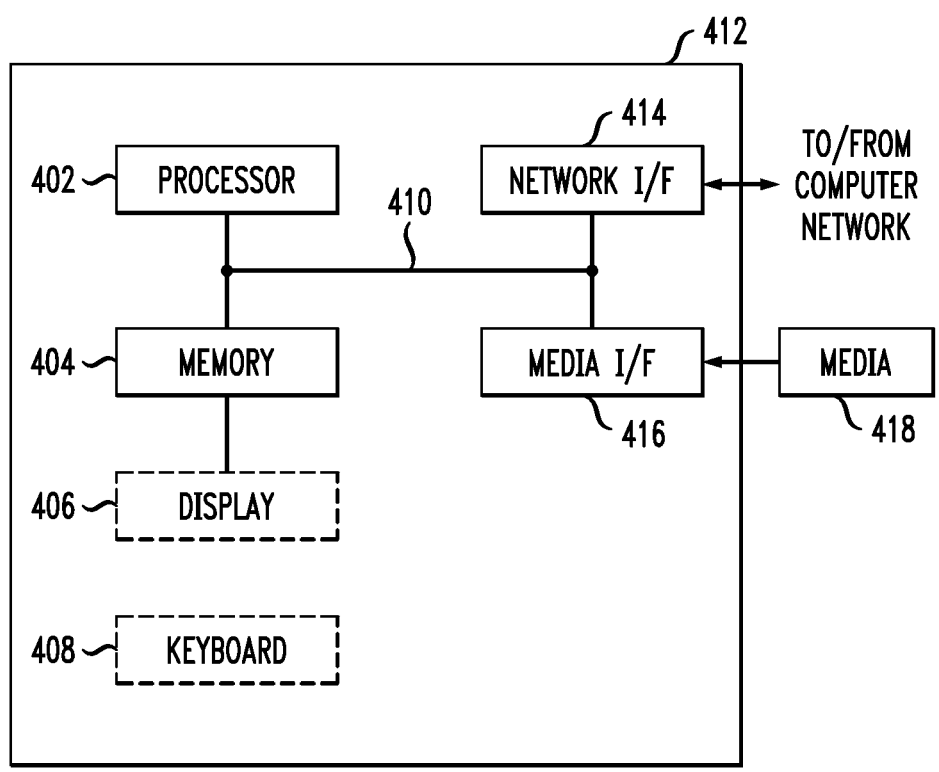
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), a Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, determining a cost-based optimization of workflows when input statistics are missing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

generating one or more individual sets of statistics for each of one or more intermediate relations of a workflow, wherein said one or more intermediate relations comprise results of one or more stages of any plan of the workflow, and wherein each individual set of statistics computes input cardinality of a corresponding intermediate relation of the workflow;

determining which statistics from the one or more individual sets of statistics to designate as a global set of statistics for the workflow, wherein said global set of statistics comprises at least one of the one or more individual sets of statistics for each of the one or more intermediate relations, and wherein said determining which statistics to designate as the global set of statistics comprises:

computing a cost for collecting each individual set of statistic of the one or more individual sets of statistics based on corresponding computed input cardinality of the individual set of statistic;

wherein the at least one of the one or more individual sets of statistics for each of the one or more intermediate relations comprised in the global set of statistics for the workflow has a lowest computed cost;

instrumenting multiple distinct plans of the workflow to be executed, wherein said instrumenting comprises identifying each of the multiple distinct plans by identifying multiple distinct orderings of multiple distinct operators of the workflow, wherein the multiple distinct operators comprise two or more of (i) a select operator, (ii) a project operator, (iii) a join operator, (iv) a group-by operator, (v) a transformation operator, (vi) a filter operator, and (vii) a user-defined function operator;

executing each of the instrumented multiple distinct plans to collect statistics for the global set of statistics for each of the executed multiple distinct plans; and determining one of the multiple plans of the workflow with a lowest cost by comparing a cost of each of the multiple plans of the workflow, wherein the cost of each of the multiple plans is derived from (a) the global set of statistics for each of the multiple distinct plans and (b) a cost model that estimates the cost based on (i) cardinalities of input relations, (ii) central processing unit (CPU) and disk-access speeds, and (iii) memory availability, and wherein said determining comprises adhering to one or more constrained resources associated with the workflow, wherein said one or more constrained resources comprise one or more memory constraints comprising at least a limit on total memory available for computing statistics;

using the determined one of the multiple plans with the lowest cost for each of one or more subsequent runs of the workflow;

wherein the steps are carried out by a computer device.

2. The method of claim 1, wherein the workflow comprises an Extract-Transform-Load (ETL) workflow.

3. The method of claim 1, wherein the workflow comprises a structured query language (SQL) statement.

4. The method of claim 1, wherein said cost for collecting each individual set of statistic of the one or more individual sets of statistics comprises a memory cost for holding the one or more individual sets of statistics.

5. The method of claim 1, wherein said cost for collecting each individual set of statistic of the one or more individual sets of statistics comprises computational overhead for measuring the one or more individual sets of statistics.

6. The method of claim 1, wherein said one or more constrained resources comprise one or more error constraints.

7. The method of claim 1, comprising:

implementing one or more semantics to leverage existing statistics.

8. The method of claim 1, comprising:

adhering to one or more requirements imposed due to materialized intermediate relations during reordering of the workflow.

9. The method of claim 1, further comprising repeating (i) said instrumenting, (ii) said executing, and (iii) said determining one of the multiple plans of the workflow per a given temporal interval.

10. An article of manufacture comprising a computer readable storage medium having computer readable instructions tangibly embodied thereon which, when implemented, cause a computer to carry out a plurality of method steps comprising:

generating one or more individual sets of statistics for each of one or more intermediate relations of a workflow, wherein said one or more intermediate relations comprise results of one or more stages of any plan of the workflow, and wherein each individual set of statistics computes input cardinality of a corresponding intermediate relation of the workflow;

determining which statistics from the one or more individual sets of statistics to designate as a global set of statistics for the workflow, wherein said global set of statistics comprises at least one of the one or more individual sets of statistics for each of the one or more intermediate relations, and wherein said determining which statistics to designate as the global set of statistics comprises:

computing a cost for collecting each individual set of statistic of the one or more individual sets of statistics based on corresponding computed input cardinality of the individual set of statistic;

wherein the at least one of the one or more individual sets of statistics for each of the one or more intermediate relations comprised in the global set of statistics for the workflow has a lowest computed cost;

instrumenting multiple distinct plans of the workflow to be executed, wherein said instrumenting comprises identifying each of the multiple distinct plans by identifying multiple distinct orderings of multiple distinct operators of the workflow, wherein the multiple distinct operators comprise two or more of (i) a select operator, (ii) a project operator, (iii) a join operator, (iv) a group-by operator, (v) a transformation operator, (vi) a filter operator, and (vii) a user-defined function operator;

executing each of the instrumented multiple distinct plans to collect statistics for the global set of statistics for each of the executed multiple distinct plans; and determining one of the multiple plans of the workflow with a lowest cost by comparing a cost of each of the multiple plans of the workflow, wherein the cost of each of the multiple plans is derived from (a) the global set of statistics for each of the multiple distinct plans and (b) a cost model that estimates the cost based on (i) cardinalities of input relations, (ii) central processing unit (CPU) and disk-access speeds, and (iii) memory availability, and wherein said determining comprises adhering to one or more constrained resources associated with the workflow, wherein said one or more constrained resources comprise one or more memory constraints comprising at least a limit on total memory available for computing statistics;

using the determined one of the multiple plans with the lowest cost for each of one or more subsequent runs of the workflow.

11. The article of manufacture of claim 10, wherein said cost for collecting each individual set of statistic of the one or more individual sets of statistics comprises a memory cost for holding the one or more individual sets of statistics and/or computational overhead for measuring the one or more individual sets of statistics.

12. The article of manufacture of claim 10, wherein said one or more constrained resources comprise one or more error constraints.

13. The article of manufacture of claim 10, wherein the plurality of method steps further comprises repeating (i) said instrumenting, (ii) said executing, and (iii) said determining one of the multiple plans of the workflow per a given temporal interval.

14. A system comprising:
a memory; and
at least one processor coupled to the memory and operative for:
generating one or more individual sets of statistics for each of one or more intermediate relations of a workflow, wherein said one or more intermediate relations comprise results of one or more stages of any plan of the workflow, and wherein each individual set of statistics computes input cardinality of a corresponding intermediate relation of the workflow;
determining which statistics from the one or more individual sets of statistics to designate as a global set of statistics for the workflow, wherein said global set of statistics comprises at least one of the one or more individual sets of statistics for each of the one or more intermediate relations, and wherein said determining which statistics to designate as the global set of statistics comprises:
computing a cost for collecting each individual set of statistic of the one or more individual sets of statistics based on corresponding computed input cardinality of the individual set of statistic;
wherein the at least one of the one or more individual sets of statistics for each of the one or more intermediate relations comprised in the global set of statistics for the workflow has a lowest computed cost;
instrumenting multiple distinct plans of the workflow to be executed, wherein said instrumenting comprises identifying each of the multiple distinct plans by identifying multiple distinct orderings of multiple distinct operators of the workflow, wherein the multiple distinct operators comprise two or more of (i) a select operator, (ii) a project operator, (iii) a join operator, (iv) a group-by operator, (v) a transformation operator, (vi) a filter operator, and (vii) a user-defined function operator;
executing each of the instrumented multiple distinct plans to collect statistics for the global set of statistics for each of the executed multiple distinct plans; and
determining one of the multiple plans of the workflow with a lowest cost by comparing a cost of each of the multiple plans of the workflow, wherein the cost of each of the multiple plans is derived from (a) the global set of statistics for each of the multiple distinct plans and (b) a cost model that estimates the cost based on (i) cardinalities of input relations, (ii) central processing unit (CPU) and disk-access speeds, and (iii) memory availability, and wherein said determining comprises adhering to one or more constrained resources associated with the workflow, wherein said one or more constrained resources comprise one or more memory constraints comprising at least a limit on total memory available for computing statistics;

using the determined one of the multiple plans with the lowest cost for each of one or more subsequent runs of the workflow.

15. The system of claim 14, wherein the at least one processor is further operative for repeating (i) said instrumenting, (ii) said executing, and (iii) said determining one of the multiple plans of the workflow per a given temporal interval.

16. A method comprising:
determining each of one or more intermediate relations for each of multiple distinct plans of a workflow, wherein said one or more intermediate relations comprise results of one or more stages of the multiple distinct plans of the workflow;
generating one or more individual sets of statistics for each of the one or more intermediate relations, wherein each individual set of statistics computes input cardinality of a corresponding intermediate relation;
determining a global set of statistics for the multiple distinct plans of the workflow, wherein said global set of statistics comprises at least one of the one or more individual sets of statistics for each of the one or more intermediate relations, and wherein said determining the global set of statistics comprises:
computing a cost for collecting each individual set of statistic of the one or more individual sets of statistics based on corresponding computed input cardinality of the individual set of statistic;
wherein the at least one of the one or more individual sets of statistics for each of the one or more intermediate relations comprised in the global set of statistics for the workflow has a lowest computed cost;
instrumenting the multiple distinct plans of the workflow to be executed, wherein said instrumenting comprises identifying each of the multiple distinct plans by identifying multiple distinct orderings of multiple distinct operators of the workflow, wherein the multiple distinct operators comprise two or more of (i) a select operator, (ii) a project operator, (iii) a join operator, (iv) a group-by operator, (v) a transformation operator, (vi) a filter operator, and (vii) a user-defined function operator;
executing each of the instrumented multiple distinct plans to collect statistics for the global set of statistics for each of the executed multiple distinct plans;
comparing the global set of statistics collected from each of the multiple distinct plans to determine one of the multiple plans with a lowest cost, wherein a cost of each of the multiple plans is derived from (a) the global set of statistics for each of the multiple distinct plans and (b) a cost model that estimates the cost based on (i) cardinalities of input relations, (ii) central processing unit (CPU) and disk-access speeds, and (iii) memory availability, and wherein said determining comprises adhering to one or more constrained resources associated with the workflow, wherein said one or more constrained resources comprise one or more memory constraints comprising at least a limit on total memory available for computing statistics; and using the determined one of the multiple plans with the lowest cost for each of one or more subsequent runs of the workflow;

wherein the steps are carried out by at least one computer device.

* * * * *